(12) United States Patent
Purdey

(10) Patent No.: US 8,011,885 B2
(45) Date of Patent: Sep. 6, 2011

(54) TURBOCHARGER SEALING ARRANGEMENT

(75) Inventor: Matthew J. Purdey, Huddersfield (GB)

(73) Assignee: Cummins Turbo Technologies Limited, Huddersfield (GB)

( * ) Notice: Subject to any disclaimer, the term of this patent is extended or adjusted under 35 U.S.C. 154(b) by 0 days.

(21) Appl. No.: 12/631,817

(22) Filed: Dec. 5, 2009

(65) Prior Publication Data

US 2010/0143114 A1    Jun. 10, 2010

Related U.S. Application Data

(63) Continuation of application No. PCT/GB2008/001886, filed on Jun. 3, 2008.

(30) Foreign Application Priority Data

Jun. 7, 2007   (GB) .................................. 0710911.9

(51) Int. Cl.
*F02B 33/44* (2006.01)
(52) U.S. Cl. ... 415/229; 415/230; 415/231; 29/888.024; 29/888.025
(58) Field of Classification Search .................. 415/229, 415/230, 231; 29/888.024, 888.025; 277/360, 277/387, 411, 419, 499, 500, 585; 416/174
See application file for complete search history.

(56) References Cited

U.S. PATENT DOCUMENTS

| | | | | |
|---|---|---|---|---|
| 3,588,125 A | * | 6/1971 | Mastromateo | 277/582 |
| 4,196,910 A | | 4/1980 | Aizu | |
| 4,447,062 A | * | 5/1984 | Leicht | 277/347 |
| 4,865,332 A | * | 9/1989 | Ruetz | 277/347 |
| 6,017,184 A | * | 1/2000 | Aguilar et al. | 415/112 |
| 2005/0188694 A1 | | 9/2005 | Frankenstein | |
| 2006/0236695 A1 | | 10/2006 | Aguilar | |

FOREIGN PATENT DOCUMENTS

| | | |
|---|---|---|
| DE | 37 37 932 A1 | 5/1989 |
| EP | 1 387 061 A2 | 2/2004 |
| WO | WO 2004/063535 A1 | 7/2004 |
| WO | WO 2006/038944 A1 | 4/2006 |

OTHER PUBLICATIONS

International Search Report, PCT/GB2008/001886, Oct. 16, 2008, Cummins Turbo Technologies, Limited.
United Kingdom Search Report, GB 0710911.9, Sep. 13, 2007, Cummins Turbo Technologies, Limited.
Written Opinion of the International Searching Authority. PCT/GB2008/00001886, Mar. 6, 2008, Cummins Turbo Technologies Limited.

* cited by examiner

*Primary Examiner* — Igor Kershteyn
(74) *Attorney, Agent, or Firm* — Krieg DeVault LLP; J. Bruce Schelkopf, Esq.

(57) ABSTRACT

A turbocharger has a sealing arrangement between the turbocharger shaft and the bearing housing adjacent to the turbine and/or the compressor housings to restrict leaking of gas into the bearing housing. At least a pair of spaced sealing rings project from an annular surface of the bearing housing into corresponding annular recesses formed on the shaft. The trailing face of the second ring or the opposite surface of the recess has a plurality of radial grooves that define leak passages that serve to maintain a very small flow of gas from the turbine or compressor housing into the bearing housing. Alternatively there is a slot in the second ring to provide the leak passage. This ensures that there is a minimum gas flow so that a large pressure gradient is not applied across the second seal thereby avoiding wear, overheating and collapse of the ring.

23 Claims, 3 Drawing Sheets

US 8,011,885 B2

TURBOCHARGER SEALING ARRANGEMENT

CROSS REFERENCE TO RELATED APPLICATIONS

The present application is a continuation of PCT/GB2008/001886 filed Jun. 3, 2008, which claims the benefit of United Kingdom Patent Application No. 0710911.9 filed Jun. 7, 2007, each of which are incorporated herein by reference.

The present invention relates to a turbocharger for an internal combustion engine and more particularly to a sealing arrangement for a turbocharger shaft for restricting gas leakage from a high pressure region to the relatively low pressure region of the turbocharger bearing housing.

Turbochargers are well known devices for supplying air to the intake of an internal combustion engine at pressures above atmospheric (boost pressures). A conventional turbocharger essentially comprises an exhaust gas driven turbine wheel mounted on a rotatable shaft within a turbine housing. Rotation of the turbine wheel rotates a compressor wheel mounted on the other end of the shaft within a compressor housing. The compressor wheel delivers compressed air to the intake manifold of the engine, thereby increasing engine power.

The turbocharger shaft is conventionally supported by journal and thrust bearings, including appropriate lubricating systems, located within a central bearing housing connected between the turbine and compressor wheel housing. It is important to provide an effective sealing arrangement at each end of the rotating shaft to restrict gas flow from a high pressure region (such as within a turbine or compressor housing) to a low pressure region (such as the bearing housing) and to prevent lubricant (oil) leakage from the central bearing housing into the compressor or turbine housing.

In existing turbocharger bearing housings a labyrinth sealing arrangement is typically provided by two or more sealing rings (piston-type rings) disposed in series. The rings are supported by the housing, project into annular grooves defined in an outer surface of the shaft and serve principally to regulate gas flow into the bearing housing from the high pressure turbine and compressor housings.

It is important for the sealing arrangement to be able to withstand the increasingly high boost pressures that are delivered by modern turbochargers. The pressure of the bearing housing is effectively at the same pressure as the engine oil sump (typically up to 100 millibar) and there is thus often a significant pressure gradient between the bearing housing and the compressor housing during turbocharger operation. Moreover, a significant pressure differential can be set up between the bearing and turbine housings when an exhaust gas engine braking arrangement is employed at the turbine outlet as this creates back pressure. The sealing arrangement must thus be able to restrict gas flow from the relatively high pressure regions of the turbine and compressor housings to the relatively low pressure region of the bearing housing. Conventional sealing arrangements provide axial and radial clearances between each ring and its respective annular groove so as to allow the passage of gas in small volumes across the seals. The last (downstream) ring in such a series will be the one that chokes the flow so the largest pressure drop is generally across that seal. If the pressure gradient is sufficiently large the last ring is forced to move axially to a point where it abuts the wall of the groove. When this happens the gas flow is prevented and the preceding sealing rings in the series offer no pressure drop. Thus the full pressure drop occurs over the final seal and its contact with the groove wall subjects it to significant friction which causes wear, heating and a reduction in ring stiffness. This impairs the sealing performance and results in significant leakage.

Under engine braking conditions, or in two stage turbocharger installations, the pressure differentials across the turbocharger seals can be high and give rise to leakage into the bearing housing. One function of the sealing rings is to limit this flow of exhaust gas. The leakage gas is called "blow by" gas, and adds to the other gas leakages (for example, past the engine piston rings) into the engine crankcase. These blow by gases mix with engine oil in the turbocharger or in the engine and are then are filtered and vented to the atmosphere, or can be routed to the compressor inlet. With increasingly stringent exhaust emission regulations there are restrictions on venting such gases to atmosphere and there is a continuing need to improve the efficiency of the turbine end seal arrangement.

It is one object of the present invention, amongst others, to provide for an improved sealing assembly in a turbocharger that obviates or mitigate the problems of gas leakage described above whilst ensuring that the sealing arrangement is able to withstand the pressure gradients to which it is typically subjected.

According to a first aspect of the present invention there is provided a method for sealing a shaft of a turbocharger to a housing in which it is mounted for rotation about an axis so as to restrict gas flow across the sealing from a relatively high pressure area to a relative low pressure area within the turbocharger, the method comprising the steps of arranging a plurality of axially spaced seals in sealing engagement with said housing so as to provide a restriction to gas flow and such that they project into recesses provided in the shaft by recess walls with axial and radial clearance to allow passage of gas across the seals from the high pressure to the low pressure area, the seals comprising a downstream seal that is closest to the low pressure area and an upstream seal, each seal being movable axially relative to its respective recess between a first position in which there is an axial clearance between said wall of the recess and the respective seal so as to allow gas to flow in the clearance past the seal from the high pressure area to the low pressure area and a second position in which the seal sealingly engages said wall so as to close said axial clearance, and allowing gas to leak through at least one leak flow passage associated with the downstream seal so as to permit gas to leak past the downstream seal in a direction towards the low pressure area when the seal is in said second position thereby maintaining a gas flow across the seals that is sufficient to ensure there is a pressure drop across the upstream seal.

When the pressure difference across the downstream seal reaches a predetermined level the downstream seal may move axially to the closed second position wherein gas is permitted to leak through the leak flow passage.

The leak flow passage may be provided in the seal, in a surface of the recess wall, in the housing or by a bore or tunnel in the shaft or housing that bypasses the seal. In one embodiment of the invention the leak flow passage may be provided by a slot in the downstream seal, the slot providing a gap in an otherwise continuous seal.

The cross sectional area of the total leakage path afforded by the downstream seal may be between a factor of 1 and 2 times greater than that provided by the upstream seal.

According to a second aspect of the present invention there is provided a turbocharger comprising:
 a turbocharger shaft rotatable about an axis;
 a turbine wheel provided at one end of the shaft for rotation about said axis within a turbine housing;
 a compressor wheel mounted to the other end of the shaft for rotation about said axis within a compressor housing;

the shaft being rotatable on at least one bearing assembly housed within a bearing housing located between the compressor housing and the turbine housing;

an annular passage defined between an inner surface of the bearing housing and said shaft, and between the bearing assembly and the compressor or turbine housing;

a seal arrangement in said annular passage, the arrangement comprising a downstream seal that is nearest to the bearing assembly and an upstream seal, each seal sealingly engaging said inner surface of the bearing housing and extending across the annular passage so as to provide a restriction to gas flow in said passage, the downstream seal being received in a downstream recess defined in the shaft and the upstream seal being received in an upstream recess defined in the shaft, each recess being defined in the shaft by a recess wall, each seal being movable axially relative to its respective recess between a first position in which there is an axial clearance between said wall of the recess and the respective seal so as to allow gas to flow in the clearance past the seal and a second position in which the seal sealingly engages said wall so as to close said axial clearance, wherein there is provided one or more leak passages associated with the downstream seal that permit(s) gas to leak past the downstream seal in a direction towards the bearing housing when the seal is in said second position, wherein said passage(s) associated with the downstream seal presents an effective total cross sectional area for gas flow in the annular passage that is greater than the effective total cross sectional area presented to the annular passage for gas flow by the upstream seal and/or by any such leak passages associated with the upstream seal when it is in the second position.

Each seal may have a leading face that faces away from the bearing assembly and a trailing face that faces towards the bearing assembly, each face being opposed by a corresponding face of the recess wall in the shaft, wherein in the first position there is an axial clearance between its trailing face and the opposite face of the recess wall and in the second position the trailing face abuts the opposite face of the recess wall.

Specific embodiments of the present invention will now be described, by way of example only, with reference to the accompanying drawings, in which:

FIG. 3b is a side view of the seal of FIG. 3a;

Figure 1:
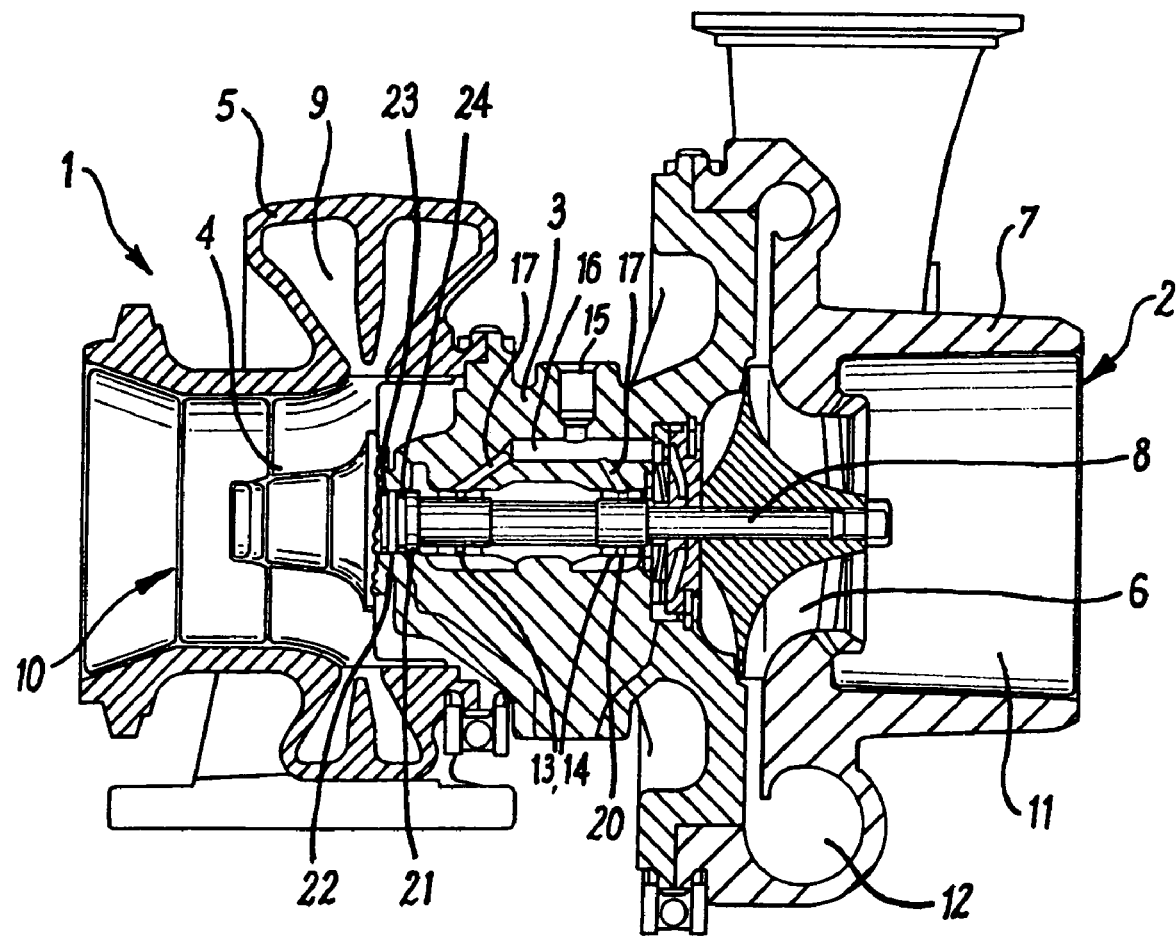
FIG. 1 is a cross-section through one embodiment of a turbocharger in accordance with the present invention.

Referring to FIG. 1, the illustrated turbocharger comprises a turbine 1 joined to a compressor 2 via a central bearing housing 3. The turbine 1 comprises a turbine wheel 4 rotating within a turbine housing 5. Similarly, the compressor 2 comprises a compressor wheel 6 that rotates within a compressor housing 7. The turbine wheel 4 and compressor wheel 6 are mounted on opposite ends of a common turbocharger shaft 8 that extends through the central bearing housing 3.

In use, the turbine wheel 4 is rotated by the passage of exhaust gas the internal combustion engine passing over it from an inlet 9 to an exhaust gas outlet 10. This in turn rotates the compressor wheel 6 that draws intake air through a compressor inlet 11 and delivers boost air to the inlet manifold of an internal combustion engine via an outlet volute 12.

The turbocharger shaft 8 rotates on fully floating journal bearings 13 and 14 housed towards the turbine end and compressor end respectively of the bearing housing 3. Oil is fed to the bearings under pressure from the oil system of the engine via an oil inlet 15, gallery 16 and passages 17. Each journal bearing 13 is retained in place by circlips and is provided with circumferentially spaced radial holes 20 for oil to pass to the turbocharger shaft 8. The oil drains out of the bearings and returns to the engine sump.

The turbine wheel 4 is connected to the turbocharger shaft 8 at an integrally formed seal boss 21, which extends in an annular passage 22 in the bearing housing wall and into the turbine housing 5. The boss 21 is sealed with respect to the annular passage 22 by means of first (upstream) and second (downstream) axially spaced sealing rings (piston-type rings) 23, 24.

Figure 2:
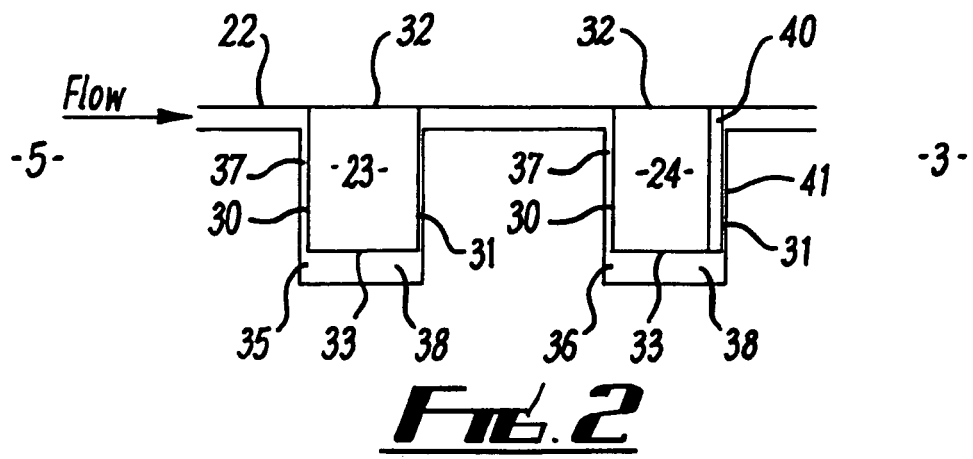
FIG. 2 is an enlarged diagrammatic sectioned view of one embodiment of a seal arrangement of the turbocharger of FIG. 1, the view being symmetrical about a horizontal axis (not shown)
Figure 3A:
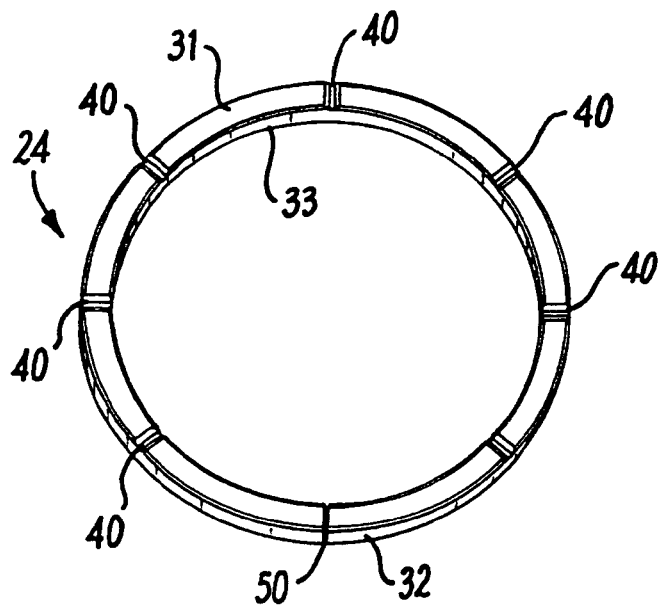
FIG. 3a is a perspective view from the front of a seal of the seal arrangement of FIG. 2.
Figure 3B:
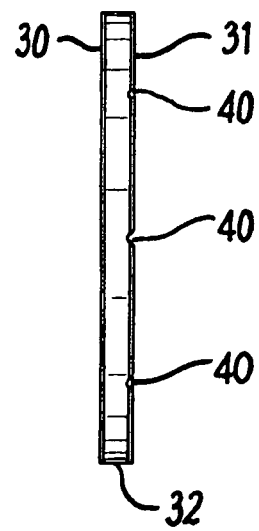

Each sealing ring 23, 24 (see FIGS. 2 and 3) has a leading, annular, radially extending, surface 30 that faces towards the turbine housing 5, an opposite trailing annular surface 31 that faces the bearing housing 3, an outer circumferential surface 32 that bears against the annular surface that defines the annular passage 22 and an inner circumferential surface 33. The rings 23, 24 project radially inwards into corresponding annular recesses 35, 36 defined in the outer surface of the seal boss 21. There are small axial and radial clearances 37, 38 between each sealing ring 23, 24 and the walls of the recess 35, 36 to allow the controlled egression of gas across the seals from the high pressure environment of the turbine housing 5 to the low pressure environment of the bearing housing 3. Each sealing ring 23, 24 is disposed such that it is able to slide in an axial direction within the confines of the recess 35, 36. The only difference between the first and second ring is that the second ring 24 (the downstream one proximate the bearing housing 3) has a plurality of radially extending equiangularly spaced grooves 40 defined in its trailing surface 31, the grooves 40 extending between the inner and outer surfaces 33, 32. This is shown in FIGS. 3a and 3b. Both sealing rings 23, 24 are split rings, wherein a narrow slot 50 allows the ring to be stretched over the seal boss 21 into the recess 35 or 36 and ensures that it is sprung radially outwards into contact with the surface of the annular passage 22 in the bearing housing. The slot is normally designed so that when the sealing ring is installed it offers an almost negligible flow path.

During operation of the turbocharger the shaft 8 moves slightly relative to the bearing housing as a result of thrust forces and thermal expansion and contraction. This movement is accommodated by the axial clearance between the sealing rings and the walls of the recesses 35, 36 and the ability of the sealing rings 23, 24 to move axially relative to the annular surface 22. At relatively low pressures the sealing rings are maintained in a position away from the walls of the recesses but as the pressure on the turbine side increases with respect to the bearing housing the sealing rings 23, 24 the rings are forced to move axially. When the pressure differential across the downstream second sealing ring 24 is high enough to force its trailing surface 31 against the opposite wall 41 of the second recess 36 (as shown in FIG. 2) gas is still able to bypass the seal by virtue of the radial grooves 40 which afford a leak passage so as to maintain a minimum gas flow. This ensures that the flow remains sufficient for the upstream sealing ring 23 (or rings) to contribute to creating a pressure drop. In FIG. 2, it can be seen that there is still a small axial clearance between the trailing surface 31 of the first ring 23 and the opposite wall of the recess 35 to maintain the flow.

The sealing arrangement prevents significant leakage of bearing oil from the bearing housing 3 into the turbine housing 5 whilst maintaining a restriction to the gas flow in the opposite direction without preventing flow completely. This avoids the application of a high loading on the second sealing ring and its consequential wear or collapse. Maintaining a minimum flow ensures that the pressure drop across the sealing arrangement is distributed across all the sealing rings. It will be appreciated that the arrangement can be used between the bearing housing 3 and the compressor housings 7 to the same effect. It is also to be understood that there may be more than just two sealing rings, with only the last (downstream) ring in the series providing the leak passage.

Figure 4:
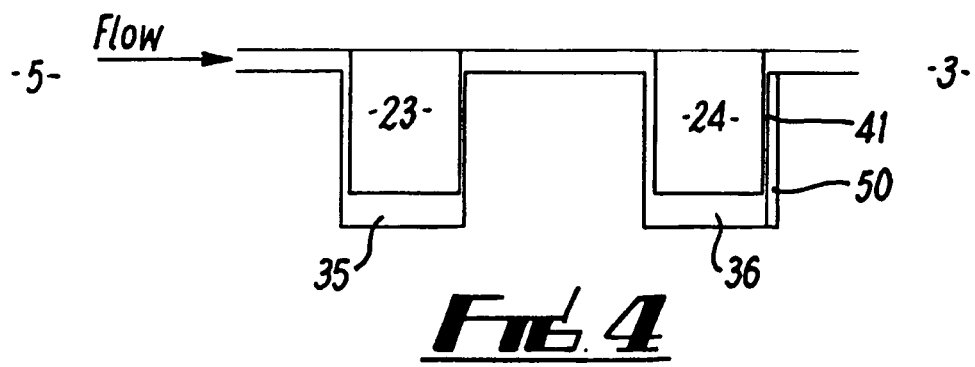
FIG. 4 is an alternative embodiment of the seal arrangement for the turbocharger of FIG. 1.

In an alternative arrangement shown in FIG. 4, the leak passage is provided by radial grooves 50 formed in the wall 41 of the recess 36 instead of the sealing ring 24. It will be appreciated that the leak passage could be provided by a combination of one or more grooves on both surfaces.

Figure 5:
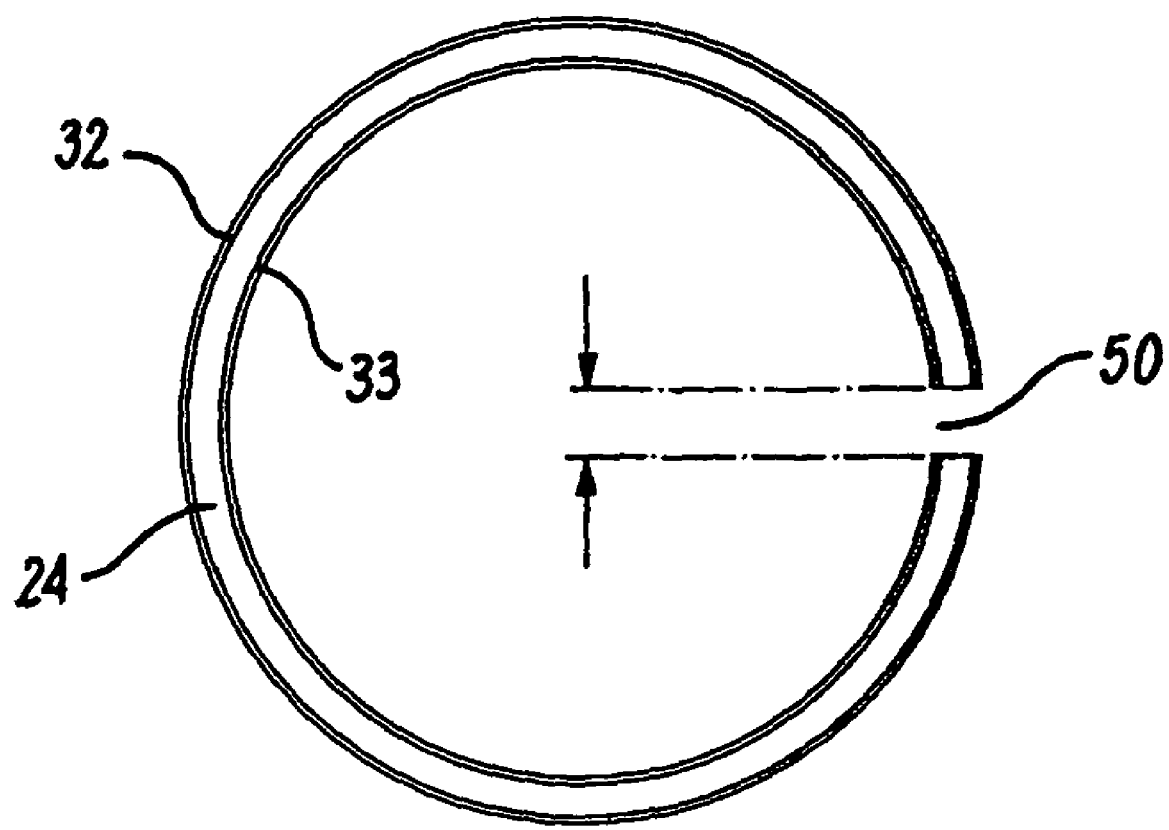
FIG. 5 is a front view of an alternative embodiment of the seal in accordance with the present invention.

In the alternative sealing ring design shown in FIG. 5, second (or final) ring in the series has no grooves on its trailing surface and instead the slot 50 is enlarged in comparison to a conventional ring. The slot extends from the outer surface 32 to the inner surface 33 of the ring so as to provide a complete gap in the annulus. It offers a leak passage much larger in comparison to those of the first or other upstream sealing rings in the series.

The size of the leak passage is typically determined in the design process by reference to the potential pressure differential across the seals and by attempting to obtain equal pressure drops across each ring. Each sealing ring can be said to have a total leakage cross sectional area of $A_x$ that consists of the axial gap (area $A_{xA}$) between the ring and the corresponding wall of the recess and any other additional leakage passage(s) (area $A_{xG}$). In the embodiment of FIGS. 2 and 3 this additional leakage passage is provided by the grooves 40. In the embodiment of FIG. 5 this additional leakage passage is that part of the slot that is exposed to the annular passage 22 i.e. that part that extends radially outboard of the recess 35, 36.

If the upstream (inlet) pressure (on the turbine side in the embodiments described above) is $P_1$ and the downstream (outlet) pressure on the bearing housing side is $P_3$. In order to obtain equal pressure drops over each sealing ring the pressure $P_2$ between the two sealing rings must be $P_2=(P_1+P_3)/2$ in which case the following approximation can be used:

$$A_2 = \frac{2A_1}{(1 + P_3/P_1)}$$

Where:
$A_1$=Total leakage area for the upstream sealing ring
$A_2$=Total leakage area for downstream sealing ring
$P_1$=Inlet pressure
$P_3$=Outlet Pressure On the basis that $P_3$ will always be non-zero and lower than $P_1$ the ratio of $A_2:A_1$ will always be larger than 1 and less than 2 in order to achieve equal pressure drops across the sealing rings.

Substituting the total leakage areas $A_1$ and $A_2$ for their component parts gives the following:

$$(A_{2A} + A_{2G}) = \frac{2(A_{1A} + A_{1G})}{(1 + P_3/P_1)}$$

It will be appreciated that the axial thrust movement described above will have the effect of relocating the sealing rings 23, 24 relative to their respective recesses 35, 36 and the ratio of $A_2:A_1$ is therefore never constant during operation. However, it can be tuned for best mean pressure distribution by pre-selecting the additional leakage areas $A_{xG}$ and the initial axial clearances. It is not possible to achieve an equal pressure drop across the seals at all conditions and a ratio of $A_2:A_1$ outside the range is to be tolerated in attempting to obtain as close to an equal pressure drop as possible over a given time.

Again it is to be understood that more than two sealing rings may be provided in the sealing arrangement.

The provision of a leak passage of this kind allows a minimum flow of gas to be maintained thus preventing all of the pressure being dropped over the downstream sealing ring nearest to the bearing assembly. The rate of wear of that sealing ring is thus reduced.

Numerous modifications to the above-described embodiments may be made without departing from the scope of the invention as defined in the appended claims. For example, the exact size and shape of the sealing rings and recesses in the shaft or seal boss may vary between turbocharger types. Furthermore, the leak passages defined by the grooves in the sealing ring (or the face of the recess or otherwise) can take any particular shape, form or number. Those that are shown in the figures as extending in a radial direction need not be strictly radial provided they allow the leakage and may indeed be in the form of a tortuous path if required. In some applications the seal boss may be supplemented with, or adapted to define, an oil slinger feature that serves to direct oil away from the shaft. An example of this is described in our European patent no EP1387061 in which the annular face of the seal boss is undercut to define an oil slinger.

The invention claimed is:

1. A method for sealing a shaft of a turbocharger to a housing in which it is mounted for rotation about an axis so as to restrict gas flow across the sealing from a relatively high pressure area to a relatively low pressure area within the turbocharger, the method comprising the steps of arranging a plurality of axially spaced seals in sealing engagement with said housing so as to provide a restriction to gas flow and such that they project into recesses provided in the shaft by recess walls with axial and radial clearance to allow passage of gas across the seals from the high pressure to the low pressure area, the seals comprising a downstream seal that is closest to the low pressure area and an upstream seal, each seal being movable axially relative to its respective recess between a first position in which there is an axial clearance between said wall of the recess and the respective seal so as to allow gas to flow in the clearance past the seal from the high pressure area to the low pressure area and a second position in which the seal sealingly engages said wall so as to close said axial clearance, and allowing gas to leak through at least one leak flow passage associated with the downstream seal so as to permit gas to leak past the downstream seal in a direction towards the low pressure area when the seal is in said second position thereby maintaining a gas flow across the seals that is sufficient to ensure there is a pressure drop across the upstream seal, wherein the leak flow passage is provided by a slot in the downstream seal, the leak flow passage in the downstream seal being larger than that in any upstream seal.

2. A method according to claim 1, wherein each seal has a leading face that faces towards the high pressure area and a trailing face that faces towards the low pressure area and in the closed position the trailing face of the seal is in abutment with an opposite surface of the annular recess into which it projects, the gas being allowed to leak through the leak flow passage so as to bypass the abutting surfaces.

3. A method according to claim 1, wherein when the pressure difference across the downstream seal reaches a predetermined level the downstream seal moves axially to the second position wherein gas is permitted to leak through the leak flow passage.

4. A method according to claim 1, wherein the cross sectional area of the total gas flow path afforded by the downstream seal is between a factor of 1 and 2 times greater than that of the upstream seal.

5. A method according to claim 1, where the slot is in the form of a circumferential gap in an otherwise substantially annular seal.

6. A turbocharger comprising:
a turbocharger shaft rotatable about an axis;
a turbine wheel provided at one end of the shaft for rotation about said axis within a turbine housing;
a compressor wheel mounted to the other end of the shaft for rotation about said axis within a compressor housing;
the shaft being rotatable on at least one bearing assembly housed within a bearing housing located between the compressor housing and the turbine housing;
an annular passage defined between an inner surface of the bearing housing and said shaft, and between the bearing assembly and the compressor or turbine housing;
a seal arrangement in said annular passage, the arrangement comprising a downstream seal that is nearest to the bearing assembly and an upstream seal, each seal sealingly engaging said inner surface of the bearing housing and extending across the annular passage so as to provide a restriction to gas flow in said passage, the downstream seal being received in a downstream recess defined in the shaft and the upstream seal being received in an upstream recess defined in the shaft, each recess being defined in the shaft by a recess wall, each seal being movable axially relative to its respective recess between a first position in which there is an axial clearance between said wall of the recess and the respective seal so as to allow gas to flow in the clearance past the seal and a second position in which the seal sealingly engages said wall so as to close said axial clearance, wherein there is provided one or more leak passages associated with the downstream seal that permit(s) gas to leak past the downstream seal in a direction towards the bearing housing when the seal is in said second position, wherein said passage(s) associated with the downstream seal presents an effective total cross sectional area for gas flow in the annular passage that is greater than the effective total cross sectional area presented to the annular passage for gas flow by the upstream seal and/or by any such leak passages associated with the upstream seal when it is in the second position.

7. A turbocharger according to claim 6, wherein there is a plurality of upstream seals each positioned in its own recess and the effective total cross sectional area presented by the downstream seal for gas flow in the annular passage that is greater than the effective total cross sectional area presented to the annular passage for gas flow by any one of the upstream seals and/or by the leak passage(s) associated with that upstream seal.

8. A turbocharger according to claim 6, wherein the leak passage associated with the downstream seal is in the form of a slot in the seal.

9. A turbocharger according to claim 8, wherein the slot extends in a substantially radial direction.

10. A turbocharger according to claim 8, wherein the slot is in the form of a gap in an otherwise substantially annular seal.

11. A turbocharger according to claim 8, wherein the slot is in the form of a gap that extends through the full axial depth of the seal.

12. A turbocharger according to claim 11, wherein the leak passage in the downstream seal has a greater circumferential length than any leak passage associated with the upstream seal.

13. A turbocharger according to claim 6, wherein the leak passage is defined in the seal.

14. A turbocharger according to claim 13, wherein the leak passage is provided by a groove defined in the trailing face of the downstream seal and/or the opposite face of the downstream recess wall.

15. A turbocharger according to claim 6, wherein the leak passage is defined in the recess wall.

16. A turbocharger according to claim 6, wherein the leak passage is defined in said inner surface of the bearing housing.

17. A turbocharger according to claim 13, wherein each seal has a leading face that faces away from the bearing assembly and a trailing face that faces towards the bearing assembly, each face being opposed by a corresponding face of the recess wall in the shaft, wherein when the downstream seal is in the first position there is an axial clearance between its trailing face and the opposite face of the recess wall and in the second position the trailing face abuts the opposite face of the recess wall.

18. A turbocharger according to claim 17, wherein the leak passage is defined in the trailing face of the downstream seal or the opposite face of the downstream recess wall.

19. A turbocharger according to claim 6, wherein the leak passage extends in a substantially radial direction.

20. A turbocharger according to claim 6, wherein there are provided a plurality of leak passages associated with the downstream seal.

21. A turbocharger according to claim 20, wherein the passages being angularly spaced around the axis of rotation of the shaft.

22. A turbocharger according to claim 6, wherein the seals are substantially annular.

23. A turbocharger according to claim 6, wherein the combined leakage cross sectional area of the main leakage passage and the axial clearance afforded by the downstream seal is in the range one to two times greater than the combined leakage cross sectional area afforded by the upstream seal.

* * * * *